US011473550B2

(12) United States Patent
Singh et al.

(10) Patent No.: US 11,473,550 B2
(45) Date of Patent: Oct. 18, 2022

(54) INTERNAL COMBUSTION ENGINES HAVING SUPER KNOCK MITIGATION CONTROLS AND METHODS FOR THEIR OPERATION

(71) Applicants: King Abdullah University of Science and Technology, Thuwal (SA); Saudi Arabian Oil Company, Dhahran (SA)

(72) Inventors: Eshan Singh, Thuwal (SA); Vedharaj Sivasankaralingam, Thuwal (SA); Vallinayagam Raman, Thuwal (SA); Mohammed Jaasim Mubarak Ali, Thuwal (SA); Hong G. Im, Thuwal (SA); Kai J. Morganti, Dhahran (SA); Gautam T. Kalghatgi, Dhahran (SA); Robert W. Dibble, Thuwal (SA)

(73) Assignees: King Abdullah University of Science and Technology, Thuwal (SA); Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/280,518

(22) Filed: Feb. 20, 2019

(65) Prior Publication Data
US 2020/0263651 A1    Aug. 20, 2020

(51) Int. Cl.
*F02P 5/04* (2006.01)
*F02D 35/02* (2006.01)
(Continued)

(52) U.S. Cl.
CPC .............. *F02P 5/04* (2013.01); *F02D 35/021* (2013.01); *F02D 35/027* (2013.01); *F02P 11/02* (2013.01); *G01L 23/22* (2013.01)

(58) Field of Classification Search
CPC . F02P 5/04; F02P 11/02; F02D 35/021; F02D 35/027; G01L 23/22
(Continued)

(56) References Cited

U.S. PATENT DOCUMENTS 5,373,726 A * 12/1994 Brinks ................. G01L 23/221
73/35.11
5,755,206 A   5/1998 Takahashi et al.
(Continued)

FOREIGN PATENT DOCUMENTS

CN    103334846 A   10/2013
CN    103603730 A    2/2014
(Continued)

OTHER PUBLICATIONS

Li et al., "Cycle Resolved Combustion and Pre-Ignition Diagnostic Employing Ion Current in a PFI Boosted SI Engine", SAE International 2015-01-0881, Published Apr. 14, 2015.
(Continued)

*Primary Examiner* — Hung Q Nguyen
*Assistant Examiner* — John D Bailey
(74) *Attorney, Agent, or Firm* — Dinsmore & Shohl LLP

(57) ABSTRACT

According to one or more embodiments presently described, a method of operating an internal combustion engine that includes injecting fuel into a combustion chamber to form an air-fuel mixture, where the combustion chamber includes a cylinder head, cylinder sidewalls, and a piston that reciprocates within the cylinder sidewalls. The method may also include detecting pre-ignition of the air-fuel mixture during a detected intake or compression stroke of the piston, determining that a super knock condition could occur, and mitigating formation of a super knock condition by deploying a super knock countermeasure within the detected compression stroke.

17 Claims, 4 Drawing Sheets

(51) Int. Cl.
*F02P 11/02* (2006.01)
*G01L 23/22* (2006.01)
(58) Field of Classification Search
USPC .......................................................... 701/111
See application file for complete search history.

(56) References Cited

U.S. PATENT DOCUMENTS

| | | | |
|---|---|---|---|
| 5,781,012 A | 7/1998 | Yasuda | |
| 5,836,285 A | 11/1998 | Aoki et al. | |
| 5,992,386 A | 11/1999 | Nytomt et al. | |
| 6,118,276 A | 9/2000 | Nakata et al. | |
| 6,196,054 B1 | 3/2001 | Okamura et al. | |
| 6,298,823 B1 | 10/2001 | Takahashi et al. | |
| 6,336,355 B1 | 1/2002 | Sasaki et al. | |
| 6,883,497 B2 | 4/2005 | Wozniak et al. | |
| 7,302,932 B2 | 12/2007 | Shelby et al. | |
| 7,533,651 B2 | 5/2009 | Surnilla | |
| 7,640,914 B2* | 1/2010 | Lewis ................. | F02D 41/0025 123/478 |
| 8,095,297 B2 | 1/2012 | Glugla et al. | |
| 8,156,923 B2 | 4/2012 | Lorenz et al. | |
| 8,171,912 B2 | 5/2012 | Glugla et al. | |
| 8,392,094 B2 | 3/2013 | Makino et al. | |
| 8,439,011 B2 | 5/2013 | Glugla et al. | |
| 8,463,533 B2 | 6/2013 | Glugla et al. | |
| 8,666,637 B2 | 3/2014 | Glugla et al. | |
| 9,038,596 B2 | 5/2015 | Glugla et al. | |
| 9,057,339 B2 | 6/2015 | Gwidt et al. | |
| 9,267,484 B2 | 2/2016 | Glugla et al. | |
| 9,273,622 B2 | 3/2016 | Glugla | |
| 9,321,572 B2 | 4/2016 | Apps et al. | |
| 9,631,572 B2 | 4/2017 | Glugla | |
| 9,897,034 B2 | 2/2018 | Tsugawa et al. | |
| 2003/0164164 A1 | 9/2003 | Butler | |
| 2006/0016431 A1* | 1/2006 | Mashiki ............. | F02D 41/3094 123/431 |
| 2007/0227503 A1 | 10/2007 | Hitomi et al. | |
| 2010/0326399 A1* | 12/2010 | Pendray .............. | F02B 29/0481 123/25 J |
| 2011/0005496 A1* | 1/2011 | Hiraya ................... | F02D 15/02 123/48 B |
| 2011/0238283 A1* | 9/2011 | Miersch-Wiemers ...................... | G01M 15/08 701/104 |
| 2011/0246049 A1* | 10/2011 | Matsuo ................... | F02P 5/045 701/111 |
| 2011/0313641 A1* | 12/2011 | Glugla ................. | F02M 69/46 701/104 |
| 2012/0029789 A1 | 2/2012 | Mehta et al. | |
| 2012/0035835 A1* | 2/2012 | Glugla ................. | F02D 35/027 701/111 |
| 2012/0111302 A1 | 5/2012 | Shishime et al. | |
| 2012/0277983 A1* | 11/2012 | Makino .............. | F02D 41/0025 701/113 |
| 2013/0311064 A1* | 11/2013 | Suzuki ................. | F02D 41/401 701/103 |
| 2014/0000552 A1* | 1/2014 | Glugla ................... | F02D 41/30 123/295 |
| 2014/0000557 A1* | 1/2014 | Glugla ................. | F02D 41/008 123/434 |
| 2014/0069368 A1* | 3/2014 | Pendray ............. | F02M 25/0228 123/25 A |
| 2014/0069369 A1* | 3/2014 | Pendray ............. | F02M 25/0225 123/25 C |
| 2014/0076272 A1* | 3/2014 | Pendray ............. | F02M 25/0222 123/25 C |
| 2014/0297164 A1 | 10/2014 | Sawdon et al. | |
| 2014/0373803 A1* | 12/2014 | Pendray .............. | F02B 29/0481 123/25 A |
| 2015/0006062 A1 | 1/2015 | Glugla et al. | |
| 2015/0059686 A1* | 3/2015 | Glugla ............... | F02M 21/0284 123/445 |
| 2015/0114342 A1 | 4/2015 | Iwai et al. | |
| 2015/0159573 A1 | 6/2015 | Glugla et al. | |
| 2015/0345419 A1* | 12/2015 | Glugla .................. | F02D 41/403 123/299 |
| 2016/0069254 A1* | 3/2016 | Pendray .............. | F02D 41/0025 123/25 C |
| 2016/0108828 A1* | 4/2016 | Glugla .................. | F02D 35/025 123/344 |
| 2016/0169147 A1* | 6/2016 | Surnilla .............. | F02D 41/2461 123/299 |
| 2016/0215706 A1 | 7/2016 | Glugla | |
| 2016/0281663 A1 | 9/2016 | Sasaki et al. | |
| 2017/0009698 A1* | 1/2017 | Tsugawa ............... | F02B 23/104 |
| 2017/0051688 A1 | 2/2017 | Glugla et al. | |
| 2017/0356365 A1* | 12/2017 | Glugla .................. | F02P 5/1523 |
| 2018/0187621 A1 | 7/2018 | Haenel | |
| 2019/0093575 A1 | 3/2019 | Inoue et al. | |

FOREIGN PATENT DOCUMENTS

| | | |
|---|---|---|
| CN | 104533618 A | 4/2015 |
| DE | 102010064186 A1 | 9/2011 |
| DE | 102015107412 A1 | 12/2015 |
| DE | 102016007766 A1 | 1/2017 |
| DE | 112016001180 T5 | 11/2017 |
| WO | 2009109819 A1 | 9/2009 |
| WO | 2017196481 A1 | 11/2017 |

OTHER PUBLICATIONS

International Search Report and Written Opinion dated Nov. 19, 2019 pertaining to International application No. PCT/US2019/050734 filed Sep. 12, 2019, 15 pgs.
International Search Report and Written Opinion dated Nov. 20, 2019 pertaining to International application No. PCT/US2019/047866 filed Aug. 23, 2019, 15 pgs.
Office Action dated Jun. 25, 2020 pertaining to U.S. Appl. No. 16/280,526, filed Feb. 20, 2019, 26 pgs.
Office Action dated Jan. 25, 2021 pertaining to U.S. Appl. No. 16/280,526, filed Feb. 20, 2019, 21 pgs.
Performance Trends, Inc., Cylinder Pressure, Accessed Jan. 12, 2021, http://www.performancetrends.com/Definitions/Cylinder-Pressure.htm#:~:text=Combustion%20%2F%20Expansion%20Stroke&text=Peak%20cylinder%20pressures%20near%20TDC,it%20forces%20the%20piston%20down.
U.S. Notice of Allowance and Fee(s) Due dated Sep. 21, 2021 pertaining to U.S. Appl. No. 16/280,526, filed Feb. 20, 2019, 13 pages.

* cited by examiner

INTERNAL COMBUSTION ENGINES HAVING SUPER KNOCK MITIGATION CONTROLS AND METHODS FOR THEIR OPERATION

BACKGROUND

Field

The present disclosure relates to internal combustion engines and, more specifically, to internal combustion engines having super knock mitigation controls.

Technical Background

Forced induction internal combustion engines include superchargers or turbochargers that pressurize an intake manifold to increase the mass of air that enters a combustion chamber during an intake stroke. At certain operating conditions, such engines are prone to develop super knock, which is a condition in which air-fuel mixture in the combustion chamber pre-ignites, which leads to high cylinder pressures that may damage engine components.

BRIEF SUMMARY

Accordingly, internal combustion engines that include super knock mitigation controls may be desired. As disclosed herein, internal combustion engines may include super knock mitigation controls that detect when conditions of super knock are occurring and deploy super knock countermeasures to reduce or eliminate the formation of the super knock conditions in the detected intake or compression stroke. The engine control modules of the internal combustion engines may sense the presence of conditions leading to super knock, for example, pre-ignition of the air-fuel mixture, accelerated pressure rise in the combustion chamber, or an anomalous decrease of rotational speed of the engine crankshaft prior to discharge of the spark plug. Through early detection of these conditions, countermeasures can be deployed within the compression stroke to mitigate or eliminate the formation of super knock conditions during the detected compression stroke.

Example of such super knock countermeasures may include injection of additional fuel into the combustion chamber, advancement of the spark plug discharge to combust, earlier, the air-fuel mixture, early exhausting of the unburned or partially burned air-fuel mixture through the exhaust valve, or combinations thereof. By deploying such countermeasures, super knock conditions, including the high pressures that are associated with damaging engine components, can be avoided or minimized, thereby preserving the engine components.

According to one or more embodiments, a method of operating an internal combustion engine includes injecting fuel into a combustion chamber to form an air-fuel mixture, the combustion chamber comprising a cylinder head, cylinder sidewalls, and a piston that reciprocates within the cylinder sidewalls. The method further includes detecting pre-ignition of the air-fuel mixture during an intake or compression stroke of the piston, determining that the internal combustion engine is operating at a condition at which a super knock condition could occur, and mitigate formation of a super knock condition by deploying a super knock countermeasure within the detected compression stroke.

According to one or more additional embodiments, an internal combustion engine includes an engine cylinder comprising a cylinder head and cylinder sidewalls, a piston that reciprocates within the engine cylinder, where the piston, the cylinder head, and the cylinder sidewalls at least partially define a combustion chamber, and an ion sensor that is positioned to sample conditions within the combustion chamber. The internal combustion engine also includes an engine control module in electronic communication with the ion sensor, where the engine control module includes a processor and a memory storing a computer readable instruction set. When executed by the processor, the engine control module evaluates at what crank angle in a detected compression stroke the ion sensor senses ion currents in the combustion chamber and deploys a super knock countermeasure within the detected compression stroke when ion currents are detected prior to a spark plug being discharged.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Described herein are one or more embodiments of internal combustion engines having super knock mitigation controls and methods for the operation thereof. The internal combustion engines may be capable of detecting pre-ignition of the air-fuel mixture during the intake stroke or compression stroke of the piston. The engines may also include engine control modules that determine the likelihood of the occurrence of a super knock condition and, upon detection of pre-ignition of the air-fuel mixture at conditions having a high likelihood of the occurrence of super knock conditions, the engine control module may deploy a super knock countermeasure within the detected intake or compression stroke to interrupt the formation of a super knock condition.

As described herein, a super knock condition in a spark-ignition internal combustion engine refers to an occurrence of irregular combustion of the air-fuel mixture in the combustion chamber in which combustion is started by pre-ignition. "Pre-ignition" represents the combustion of the fuel-air mixture triggered by a "'hot-spot," other than the spark, prior to the spark timing. However, depending on pre-ignition timing and pre-ignition location within the combustion chamber, pre-ignition may cause subsequent different combustion phenomena, including non-knocking combustion. Super knock often occurs under low-speed and high-load engine operating conditions. Super knock conditions appear to occur sporadically when evaluating the engine cycle-to-cycle, and therefore accurate prediction of whether super knock conditions will occur may not be directly correlated to engine operating conditions alone. Determining that such engine operating conditions are present may aid in determining the likelihood of a super knock condition.

Super knock is distinguished from conventional engine knock, which is due to auto-ignition of the end-gas of the air-fuel mixture before the spark plug-initiated flame propagation consumes the end gas in the combustion chamber.

Figure 1:
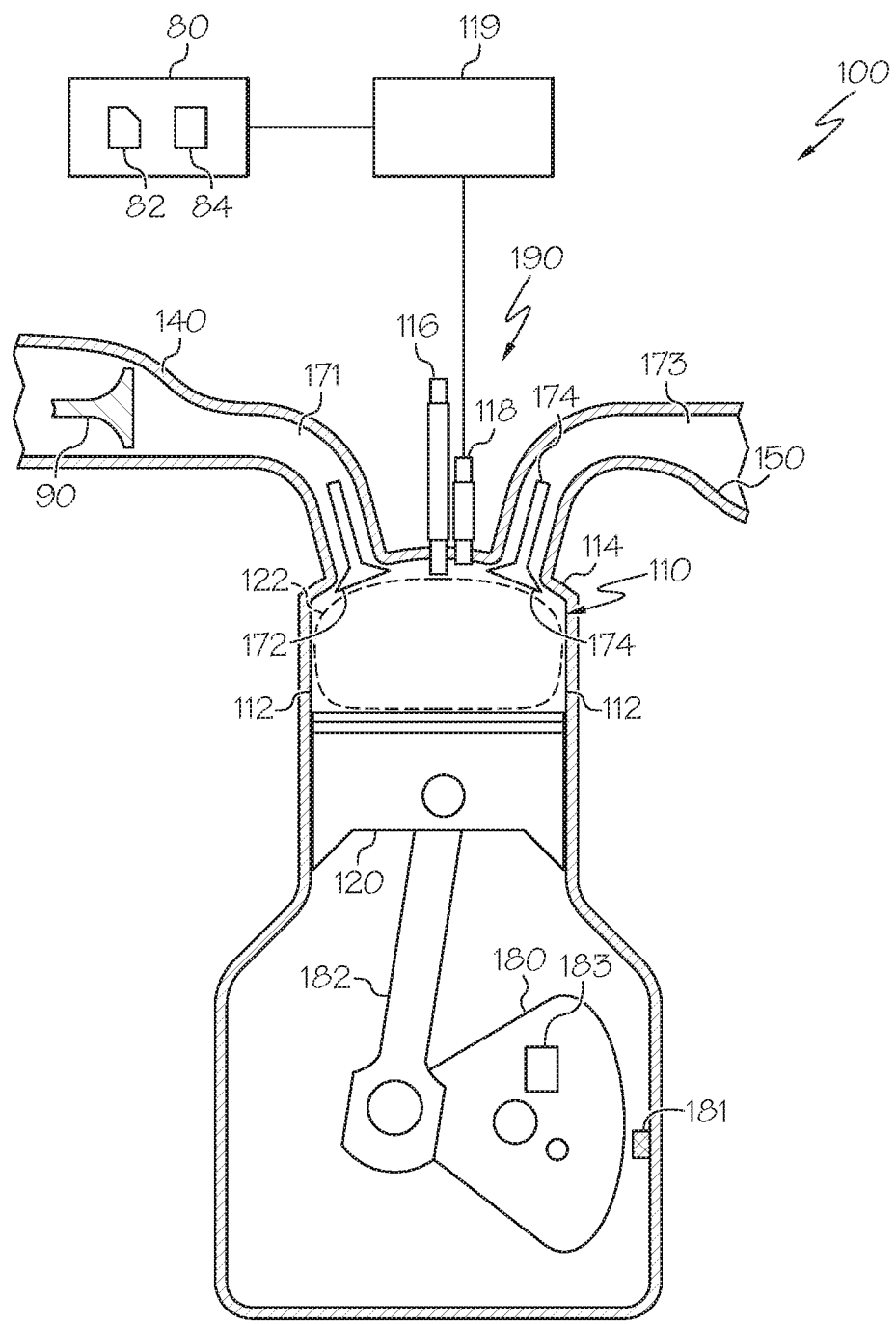
FIG. 1 schematically depicts a cross-sectional view of a portion of an engine cylinder of an internal combustion engine, according to one or more embodiments described herein.

Referring to FIG. 1, a schematic illustration of a portion of an internal combustion engine 100 is depicted. In particular, FIG. 1 depicts a single engine cylinder 110 of an internal combustion engine 100. However, as is understood by those having skill in the art, an internal combustion engine 100 may comprise numerous engine cylinders, such as engine cylinder 110, which may be arranged in a variety of configurations along the length of one or more crank shafts, such as crank shaft 180 depicted in FIG. 1.

The internal combustion engine 100 may comprise at least an engine cylinder 110, an intake port 171, an exhaust port 173, and a piston 120. The intake port 171 is regulated by an intake valve 172 that is positioned to selectively open and close the intake port 171 that connects to the engine cylinder 110 with an intake manifold 140. Similarly, the exhaust port 173 is regulated by an exhaust valve 174 that is positioned to selectively open and close the exhaust port 173 that connects the engine cylinder 110 to an exhaust manifold 150.

The volume defined on the top and sides by the engine cylinder 110 and on the bottom by the piston 120 is referred to as the combustion chamber 122. The intake port 171 and the exhaust port 173 allow air, air-fuel mixture, and/or combustion products to enter and exit the combustion chamber 122 at various times throughout the engine cycle. A spark plug 118 includes an electrode that is positioned at the combustion chamber 122 to provide combustion initiation in timed electrical bursts. In some embodiments, the spark plug 118 may be positioned at or near the center of the combustion chamber 122 (for example, at or near the radial center with respect to the walls of the cylindrical-shaped engine cylinder 110).

In some embodiments, the intake valve 172 and/or the exhaust valve 174 are connected to one or more cams or camshafts (not depicted in FIG. 1) which may serve to selectively open and close the intake valve 172 and/or the exhaust valve 174, which thereby maintain the selective opening and closing of the respective intake port 171 and exhaust port 173 in time with the engine operation. The piston 120 may be coupled to a crank shaft 180 by a connecting rod 182. The engine cylinder 110 may comprise a cylinder head 114 and cylinder sidewalls 112. The intake port 171 and the exhaust port 173 may be positioned on the cylinder head 114. Additionally, a fuel injector 116 and spark plug 118 may be positioned in the cylinder head 114 and extend into the combustion chamber 122 such that the fuel injector 116 and the spark plug 118 can act on the air and/or air-fuel mixture that is present within the combustion chamber 122. The spark plug 118 may be electronically coupled to an ignition system 119 that electrically discharges via the spark plug 118.

It should be understood that while FIG. 1 depicts a direct injection configuration (that is, the fuel enters the combustion chamber 122 directly by fuel injector 116), a port injection scheme (sometimes referred to as indirect injection) may be suitable in other embodiments, where fuel is injected into the intake port 171 and is subsequently passed into the combustion chamber 122. As such, the "injecting" (i.e., the "passing") of fuel into the combustion chamber 122 may comprise direct injection, port injection (indirect injection), or both.

The internal combustion engine 100 may operate by repeated combustion of an air-fuel mixture that is present within the combustion chamber 122 during a compression and an expansion stroke. The combustion of the air-fuel mixture further pressurizes the combustion chamber 122, which causes the piston 120 to translate away from the cylinder head 114. The translation of the piston 120 rotates the crank shaft 180. As the piston 120 translates away from the cylinder head 114, the high pressure in the combustion chamber 122 from the combustion of the air-fuel mixture is directed into the rotation of the crank shaft 180. The crank shaft 180 may rotate through a top dead center position (corresponding to the closest position of the piston 120 relative to the cylinder head 114) and a bottom dead center position (corresponding to the furthest position of the piston 120 relative to the cylinder head 114). In one or more embodiments, the internal combustion engine 100 may operate as a four stroke engine, although other engine configurations are contemplated. In such an embodiment, intake, compression, power, and exhaust strokes cycle in a regular and sequential manner. In the intake stroke, the piston moves downward and air and/or fuel may enter the combustion chamber 122 through the intake port 171. In the compression stroke, the air and/or fuel are compressed as the piston 120 moves toward the cylinder head 114. Fuel is also injected into the combustion chamber 122 during the intake stroke or early in the compression stroke. In the power stroke, the piston is forced away from the cylinder head 114 by combusted air-fuel mixture, which is now at an elevated temperature and pressure due to the combustion of the air-fuel mixture near or at TDC. In the exhaust stroke, the piston 120 moves toward the cylinder head 114 to direct exhaust gases (products of the combustion reaction) out of the combustion chamber 122 through the open exhaust port 173.

The internal combustion engine 100 also includes a compressor 90 that is positioned proximate to the intake manifold 140. The compressor 90 increases the pressure of the air that is in the intake manifold 140, so that a larger mass of air can be directed into the combustion chamber 122 during an intake stroke. The compressor 90 may be coupled to a turbine (not shown) that is positioned within an exhaust manifold 150. The turbine extracts energy from the combustion products and uses that energy to pressurize air directed into the intake manifold 140. Such a compressor 90 and turbine system is referred to as a "turbocharger." In other embodiments, the compressor 90 may be coupled to rotating hardware of the internal combustion engine 100, for example the crank shaft 180. Such a rotationally coupled compressor 90 is referred to as a "supercharger."

The internal combustion engine 100 also includes an engine control module 80. The engine control module 80 may include a processor 82 and a memory 84 storing a computer readable instruction set and look-up tables. The engine control module 80 is in electronic communication with various components of the internal combustion engine 100, including the fuel injector 116, the ignition system 119 that is in electronic communication with the spark plug 118, various engine sensors, such as a throttle position sensor (not shown), an intake manifold pressure and temperature sensor (not shown), and a crank angle sensor 181 that detects the angular orientation of the crankshaft 180 throughout its range of rotation. The engine control module 80 may evaluate the various engine sensors to determine the operational condition of the engine and power demand from the operator. The engine control module 80 may modify the timing and quantity of fuel delivered to the combustion chamber 122 by controlling the fuel injector 116 and may also modify the timing of the discharge of the spark plug 118. The engine control module 80 is programmed with a fuel schedule and a spark timing schedule, which allows the internal combustion engine 100 to be operated according to pre-defined characteristics that satisfies power delivery, fuel consumption, and emissions targets.

In some embodiments, the internal combustion engine 100 may include an ion sensor 190 that is positioned to sense the presence of ions in the combustion chamber 122. In the depicted embodiment, the ion sensor 190 is incorporated into the spark plug 118. Without being bound by theory, combustion of an air-fuel mixture releases ions within the combustion chamber 122. These ions can create an ion cloud in the combustion chamber 122. An ion cloud generally refers to an area of increased concentration of ions, which may fill or partially fill the combustion chamber 122. An ion sensor 190 can detect the ion cloud by inducing an ion current via an applied voltage between electrodes. When the ion current is detected in the compression cycle prior to discharge of the spark plug 118, it can be assumed that the detected ion current in the combustion chamber 122 was caused by pre-ignition of the air-fuel mixture. Therefore, early detection of pre-ignition in the combustion chamber 122 may allow for countermeasures to be deployed to mitigate the subsequent formation of super knock conditions.

Figure 2:
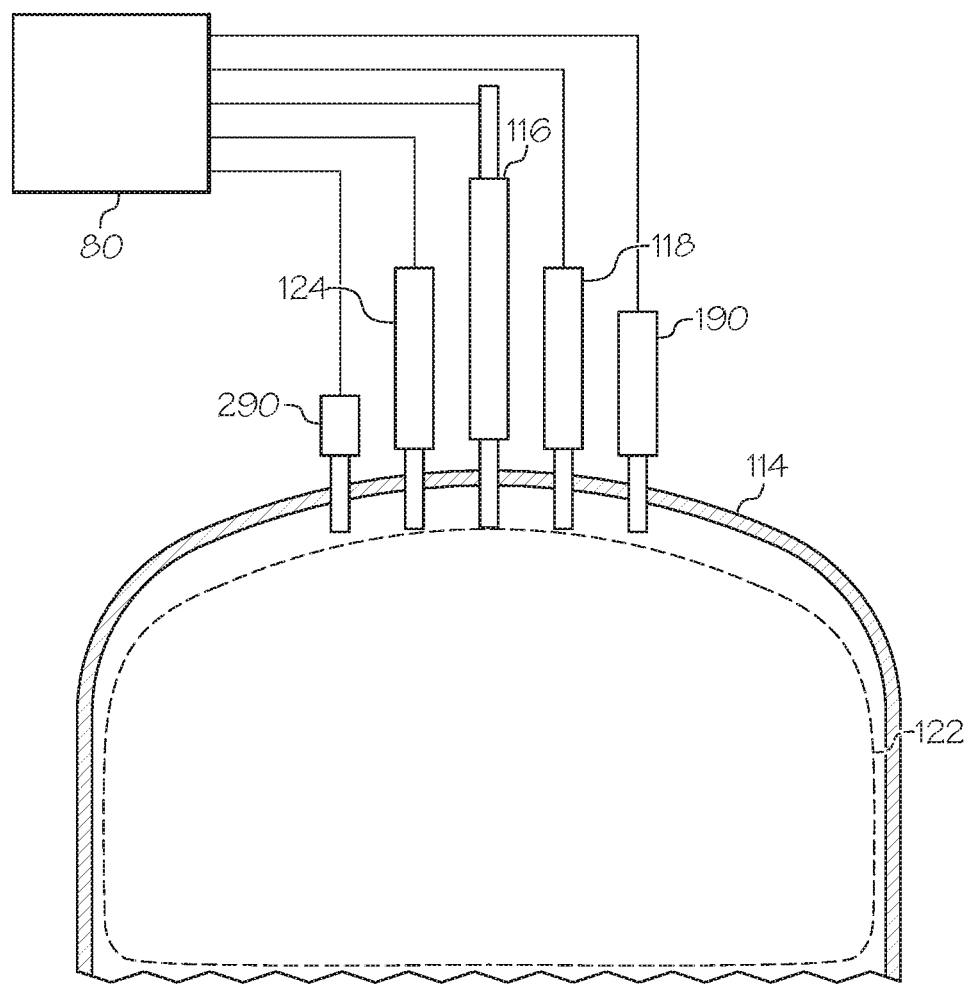
FIG. 2 schematically depicts a partial cross-sectional view of a portion of a cylinder of an internal combustion engine, according to one or more embodiments described herein.

The ion sensor 190 is in electronic communication with the engine control module 80. In the embodiment depicted in FIG. 1, the ion sensor 190 is incorporated into the spark plug 118, such that the spark plug 118 can be used to detect the presence of ion currents in the combustion chamber 122. The spark plug 118 includes an electrode 117 that can be used to detect the presence of an ion current in the combustion chamber 122. Referring to FIG. 2, in some embodiments, the ion sensor 190 may be a stand-alone sensor that is independent from the spark plug 118 and is positioned to sample within the combustion chamber 122.

Ions generated by the combustion of the air-fuel mixture in the combustion chamber 122 may be detected by the ion sensor 190 that may fluctuate in a predetermined frequency band, for example from about 8 kHz to about 13 kHz. Detecting variations in the ion current within this frequency band may correspond to a pre-ignition event of the air-fuel mixture. The frequency bands at which the ion current tends to fluctuate may vary based on engine hardware and/or engine load conditions. In some embodiments, the frequency band may be targeted based on known conditions at which there is an increased likelihood of super knock conditions forming.

Figure 3:
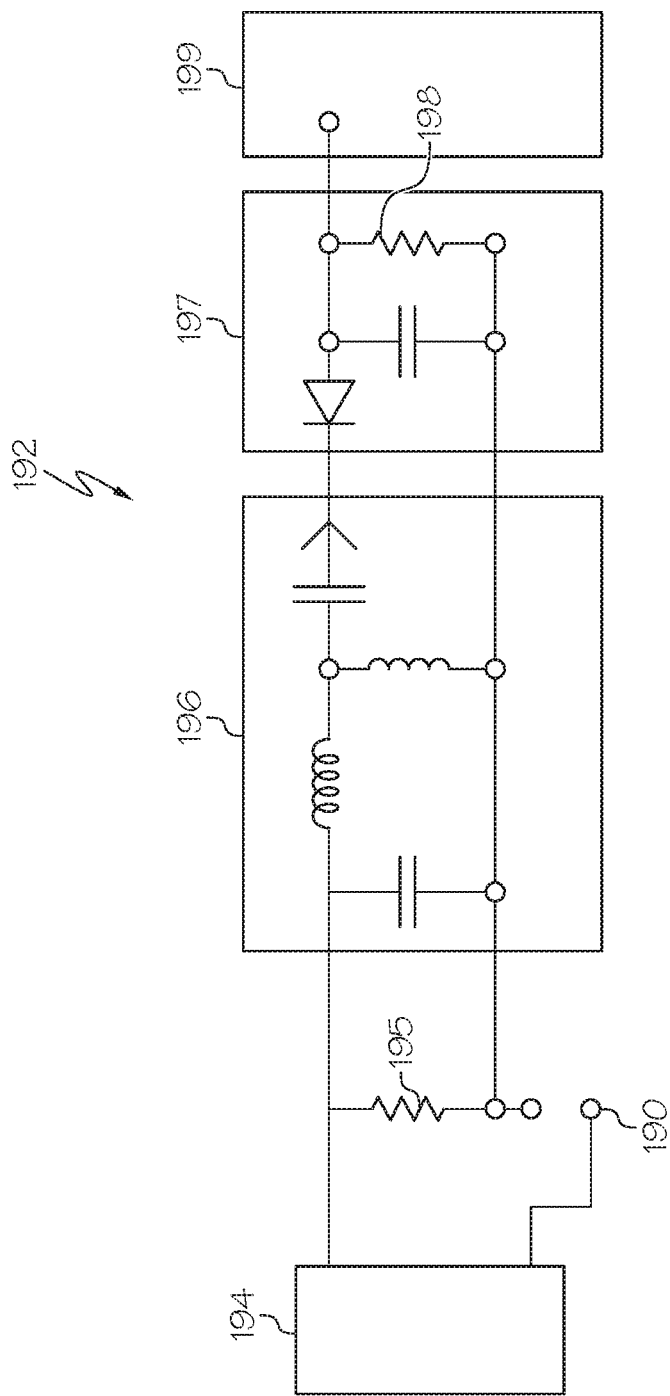
FIG. 3 schematically depicts an alternating current AC band pass filter circuit for detection of AC or DC ion current, according to one or more embodiments described herein.
Figure 4:
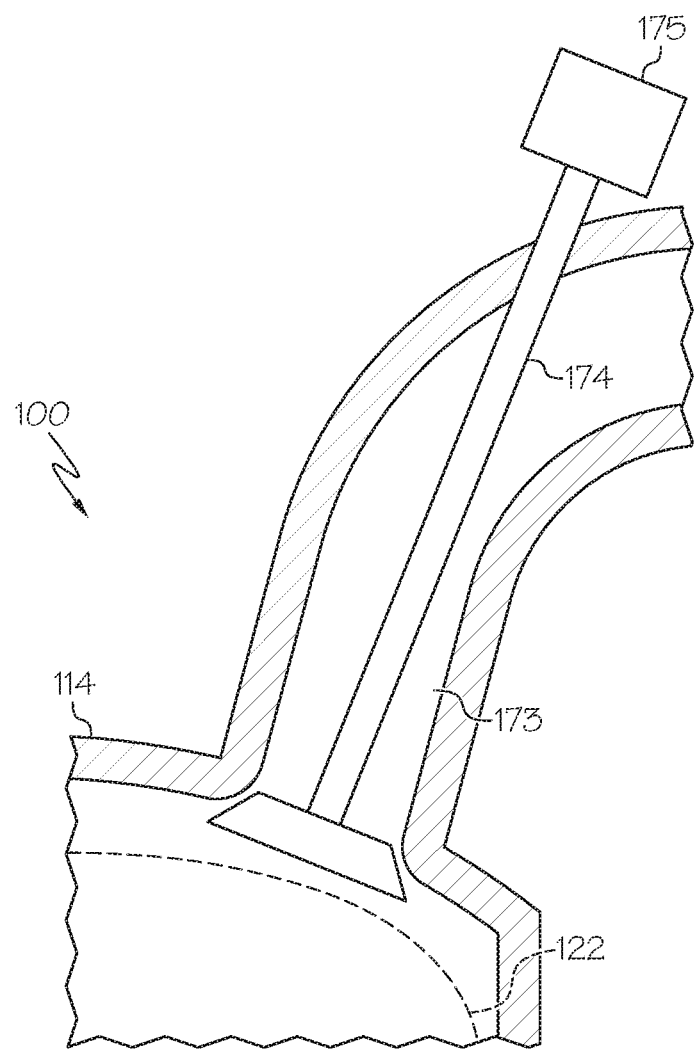
FIG. 4 schematically depicts a partial cross-sectional view of a portion of a cylinder of an internal combustion engine, according to one or more embodiments described herein.

According to one more embodiments, the ion sensor 190 may be a direct current sensor. In one or more alternative embodiments, the ion sensor 190 may be an alternating current sensor. In embodiments where an alternating current sensor is utilized, a band pass filter circuit or a phase lock loop detection circuit may be incorporated. For example, now referring to FIG. 3, the ion sensor 190 may be coupled to a band pass filter circuit 192. The band pass filter circuit 192, as depicted, includes a signal generator 194, an analogue band pass filter 196, an integration half or full wave rectifier 197, and a threshold detector 199 such as a pulse delay generator trigger. The integration half or full wave rectifier 197 may include an integration capacitor and resistor combination. In one embodiment, the signal generator may operate at 10 kHz at a voltage of 20-110 volts measured peak-to-peak. The analogue band pass filter 196 may operate at 10 kHz. The band pass filter circuit 192 may include a first resister 195 at 0.5 Mega Ohms and a second resister 198 at 1.0 Mega Ohms. The band pass filter circuit 192 detects when there is an ion current signal that is measured to the ion sensor 190. The band pass filter circuit 192 may also filter noise from the input signal to reduce the likelihood of false-positives of detection of an ion current. The band pass filter circuit 192 may also allow for detection of the ion current at the detected frequency to allow for detection of nascent ion current quickly after development of a pre-ignition spot in the air-fuel mixture. In additional embodiments, a phase lock loop detection circuit may be utilized which operates on the principles of phase lock loop control.

Referring again to FIG. 1, in operation, the ion sensor 190 may quickly detect the presence or emerging presence of an ion current signal that corresponds to the nascent existence of ions in the combustion chamber 122. Because the ion sensor 190 is quick to detect such an ion creation, the engine control module 80 may deploy countermeasures within the detected compression stroke in which the ions are detected. By being able to rapidly deploy such countermeasures (e.g., within the same engine stroke), the engine control module 80 can mitigate the formation of super knock conditions in the combustion chamber 122 during the detected compression stroke. In some embodiments, the super knock countermeasure is deployed well before the piston reaches top dead center in the compression stroke. This rapid deployment allows for real-time correction of the conditions which may cause super knock.

The presence of ions in the combustion chamber 122 may indicate the initiation of combustion in the combustion chamber 122. The presence of an ion current in the combustion chamber 122 indicates the presence of ions. The presence of ions prior to discharging of the spark plug 118, therefore, may indicate pre-ignition of the air-fuel mixture. Early detection of an ion current in the combustion chamber 122, therefore, can be used to determine the likelihood of a super knock condition being present in the combustion chamber 122. For example, if the internal combustion engine 100 is operating at a condition at which super knock could occur, or is more likely to occur (e.g., low speed high load conditions), the detection of ions in the combustion chamber 122 prior to discharge of the spark plug 118 may indicate that a super knock condition is likely. In one or more embodiments, the conditions in which super knock could occur, or is more likely to occur may include engine speed of less than 3000 rotations per minute and at least 17 bar load. Further, in some embodiments, the presence of the ions may be detected over a number of crank angles while the piston is moving in the compression stroke, which may further indicate that super knock conditions are possible or likely. The engine control module 80 of the internal combustion engine 100, therefore, may initiate a super knock countermeasure during the measured compression stroke to mitigate the formation of super knock conditions in the combustion chamber 122.

In some embodiments, the amount of ion current detected in the combustion chamber 122 also corresponds to the amount of fuel that is consumed in the combustion chamber 122. Accordingly, the engine control module 80 can determine from the amount of fuel consumed over a number of crank degrees to determine with increased precision whether the air-fuel mixture is being consumed in an amount corresponding to a higher likelihood that a super knock condition will occur.

Referring again to FIG. 2, in some embodiments, the internal combustion engine 100 may include a pressure sensor 290 that is positioned to sense the pressure in the combustion chamber 122. In one embodiment, the pressure sensor 290 is coupled to the cylinder head 114 of the internal combustion engine 100, and a portion of the pressure sensor 290 may be positioned to extend into the combustion chamber 122. The pressure sensor 290 is in electronic communication with the engine control module 80. The pressure sensor 290 evaluates the pressure within the combustion chamber 122. The engine control module 80 or another processing computer can compare the pressures measured in the combustion chamber 122 by the pressure sensor 290 at various crank angles with a nominal pressure profile for each compression stroke. By comparing the measured pressures during each compression stroke, the engine control module 80 can determine if the instantaneous measured compression stroke is deviating from the nominal pressure profile. If the pressure profile for the measured compression stroke exceeds the pressure in the nominal pressure profile, it can be assumed that the pressure in the combustion chamber 122 is rising more quickly than in the nominal profile due to pre-ignition of the air-fuel mixture. In such cycles, the engine control module 80 may initiate a super knock countermeasure during the measured compression stroke to mitigate the formation of super knock conditions in the combustion chamber 122.

Referring again to FIG. 1, the instantaneous rotational speed of the crank shaft 180 may slow during a compression stroke in which pre-ignition of the air-fuel mixture is occurring. The pressures inside the combustion chamber 122 may increase with pre-ignition of the air-fuel mixture, which may increase the resistance of the piston 120 to move toward the cylinder head 114. The increased pressure in the combustion chamber 122, therefore, may slow the rotational speed of the crank shaft 180. In some embodiments, a decrease in the rotational speed of the crank shaft 180 may be measured by sensors that evaluate the position, speed, or acceleration of the crank shaft 180. Such sensors may include, for example, the crank angle sensor 181, a crank speed sensor (not shown), or a crank accelerometer 183. The sensors, for example, the crank angle sensor 181 and the crank accelerometer 183, are in electronic communication with the engine control module 80. The engine control module 80 or another processing computer can determine if the crank shaft 180 is exhibiting an instantaneous decrease in rotational velocity during the compression stroke within one of the internal combustion engine's 100 combustion chambers 122. If such a decrease in rotational velocity of the crank shaft 180 is detected, the engine control module 80 may initiate a super knock countermeasure during the measured compression stroke to mitigate the formation of super knock conditions in the combustion chamber 122.

As highlighted hereinabove, a super knock condition is possible or likely to occur when the air-fuel mixture that is present in the combustion chamber 122 pre-ignites prior to initiation of a flame front caused by discharge of the spark plug 118 and typically at low speed high power engine conditions. It should be appreciated that a number of factors play into the probability that super knock will occur, and that the presently disclosed systems and methods may be utilized to identify the possibility of or the relatively high probability of superknock occurring and deploying preventative measures. For example, the preventative measures may be employed when superknock has a 1%, 5%, 10%, 25%, or even 50% chance of occurring. Embodiments of the internal combustion engine 100 according to the present disclosure are capable of deploying super knock countermeasures during the compression stroke of the internal combustion engine 100 in which pre-ignition of the air-fuel mixture is detected. Deploying such super knock countermeasures within the detected compression stroke allows the internal combustion engine to mitigate the formation of super knock conditions, which may result in lower cylinder pressures being exhibited in the combustion chamber 122 than when super knock conditions are present. Further, because the super knock conditions appear sporadically, the super knock countermeasures can be deployed only in compression strokes that correspond to a high likelihood of super knock conditions occurring. Selective deployment of the super knock countermeasures allow for the internal combustion engine 100 to operate at targeted fuel consumption and power delivery levels when deployment of the super knock countermeasures are not needed.

In one embodiment, the super knock countermeasure includes advancing spark timing to discharge the spark plug 118 prior to the piston 120 reaching top dead center. In such an embodiment, the spark plug 118 may be discharged as soon as pre-ignition of the air-fuel mixture is detected, so that a flame front that expands through the air-fuel mixture from the spark plug 118 expands prior to the piston 120 reaching top dead center. In some embodiments, the discharge of the spark plug 118 may be set to a set point at which all of the air-fuel mixture may be ignited and/or burned prior to the piston 120 reaching top dead center. The advance of the discharge of the spark plug 118 will reduce power output of the internal combustion engine 100 for the detected and, thus, advanced cycle. The correction may be deployed to a single engine cylinder, and therefore may not greatly reduce total engine power. In some embodiments, advancing the timing of the discharge of the spark plug 118 may introduce conventional engine knock into the internal combustion engine 100, because the heating and the pressure increase of the air-fuel mixture in the combustion chamber 122 may cause unburned portions of the air-fuel mixture to auto ignite. However, the advance in timing of the discharge of the spark plug 118 may interrupt the continuation of conditions that lead to super knock conditions forming in the combustion chamber 122.

Early ignition of the air-fuel mixture will lead to an increase in pressure in the combustion chamber 122 prior to the piston 120 reaching top dead center. This pressure will reduce engine power for the selected cycle of the selected engine cylinder 110, and will increase fuel consumption of the internal combustion engine 100 over cycles in which the super knock countermeasure is deployed. Advancing the timing of the discharge of the spark plug 118 will reduce the power delivered by the internal combustion engine 100 and will increase the fuel consumption of the internal combustion engine 100, but will reduce the maximum pressures experienced by components of the internal combustion engine 100 as compared to those experienced in super knock conditions, thereby protecting those components from damage caused by super knock conditions. Because the high pressures experienced by engine components during super knock conditions can damage engine components, pressures associated with the super knock countermeasures, including pressures associated with conventional engine knock, are preferred.

Referring again to FIG. 2, in one embodiment, the internal combustion engine 100 may include a second spark plug 124 that is positioned to ignite air-fuel mixture that is present in the combustion chamber 122. The second spark plug 124 may be configured to be discharged only upon detection of formation of super knock conditions by the engine control module 80. In some embodiments, the ignition system 119 may not have sufficient charge built up early in the compression stroke to discharge the spark plug 118 to ignite the air-fuel mixture. In such cases, the ignition system 119 may hold a charge for the second spark plug 124 early in the compression cycle for the designated combustion chamber 122. Therefore, when pre-ignition of the air-fuel mixture is detected, the second spark plug 124 has sufficient charge to ignite the air-fuel mixture and initiate an early flame front through the combustion chamber 122.

In one embodiment, the super knock countermeasure includes exhausting of the air-fuel mixture and burned portions of the air-fuel mixture during the compression stroke in which pre-ignition of the air-fuel mixture is detected. Some embodiments of the internal combustion engine 100 may include an exhaust valve 174 that has a hydraulic or an electronic lift mechanism 175. The lift mechanism 175 is in electronic communication with the engine control module 80. Under normal operation, the lift mechanism 175 selectively opens and closes the exhaust valve 174 according to a predetermined schedule to selectively vent and seal, respectively, the combustion chamber 122 at the exhaust port 173. When the engine control module 80 determines that pre-ignition of the air-fuel mixture has occurred in a compression stroke, the engine control module 80 may deploy a super knock countermeasure of commanding the lift mechanism 175 to open the exhaust valve 174 during the detected compression stroke to reduce the pressure in the combustion chamber 122 and to pass unburned and burned air-fuel mixture from within the combustion chamber 122 to outside of the combustion chamber 122. In such conditions, the engine control module 80 may also interrupt the spark plug 118 from discharging during the detected compression cycle. Opening the exhaust valve 174 with the lift mechanism 175 during the detected compression stroke may interrupt the conditions leading to formation of super knock conditions in the combustion chamber 122. For example, the contents of the combustion chamber 122 may be vented by activation of the lift mechanism.

In yet another embodiment, the super knock countermeasure includes an additional injection of fuel into the combustion chamber 122 to cool the air-fuel mixture that is present in the combustion chamber 122, to enrich the air-fuel mixture to reduce the likelihood of continued formation of super-knock conditions, and to quench any flame front that has formed in the combustion chamber 122 due to pre-ignition of the air-fuel mixture. In such embodiments, when the engine control module 80 senses that pre-ignition of the air-fuel mixture has occurred during the compression stroke, the engine control module 80 may direct the fuel injector 116 to inject fuel into the combustion chamber 122 during the detected compression stroke. By injecting the additional fuel in the detected compression stroke, the additional fuel can cool the air-fuel mixture, thereby stopping or delaying further combustion of the air-fuel mixture caused by pre-ignition. Accordingly, the injection of additional fuel may interrupt super knock conditions from forming in the combustion chamber 122.

In some embodiments, the super knock countermeasures may be selected to be deployed at engine conditions at which super knock conditions could or are likely to occur. For example, super knock conditions are likely to occur at low speed high power engine conditions corresponding to throttle tip in. Because super knock conditions have a lower likelihood of occurring at other engine conditions, including at idle and when operating at wide open throttle at or near maximum engine speed, deploying the super knock countermeasures may cause undesired effects, such as undesired engine knock, reduced power, or an increase in fuel consumption.

The engine control module 80 may include a super knock countermeasure schedule that corresponds to engine conditions at which super knock conditions are possible or likely to occur. When the engine operates within these conditions, the engine control module 80 is selected to deploy the super knock countermeasures when pre-ignition of the air-fuel mixture is detected. When the engine operates outside of these conditions, the engine control module 80 is locked out from deploying the super knock countermeasures. Because super knock conditions are unlikely to form at such engine conditions, the engine control module 80 does not need to deploy the countermeasures to maintain healthy engine operation. Accordingly, by electing to not deploy the super knock countermeasures at engine conditions at which there is a low likelihood of super knock conditions occurring, engine power and fuel economy can be maintained by maintaining spark timing and maintaining an air-fuel ratio near a stoichiometric ratio with little concern of super knock conditions forming in the engine.

It should now be understood that internal combustion engines according to the present disclosure include elements that detect pre-ignition of an air-fuel mixture that is present in the combustion chamber of the engine during an intake or compression stroke. When the engine is operating under conditions corresponding to formation of super knock conditions, the engine control module may deploy super knock countermeasures to interrupt the formation of super knock conditions in the detected compression stroke. Deploying the super knock countermeasures may result in an increase in pressure conditions in the combustion chamber, but reduce the pressure conditions in the combustion chamber as compared to when super knock conditions are permitted to fully develop. Interrupting the full development of super knock conditions within the combustion chamber may ensure engine health and may stop premature engine failure due to super knock.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents. It is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure.

What is claimed is:

1. A method of operating an internal combustion engine, the method comprising:
   injecting fuel into a combustion chamber to form an air-fuel mixture, the combustion chamber comprising a cylinder head, cylinder sidewalls, and a piston that reciprocates within the cylinder sidewalls;
   detecting, with at least one of a pressure sensor, a crank angle sensor, a crank speed sensor and a crank accelerometer, pre-ignition of the air-fuel mixture during a detected intake or compression stroke of the piston;
   analyzing, using a processor-based engine control module, the detected pre-ignition of the air-fuel mixture to determine that the internal combustion engine is operating at a condition at which a super knock condition could occur;
   discharging a spark plug to initiate combustion of the air-fuel mixture in timed electrical bursts during a time corresponding to the same one of the detected intake or compression stroke to burn all that remains of the air-fuel mixture that is present in the combustion chamber before the piston reaches top dead center; and
   using the control module, upon a determination that the internal combustion engine is operating at a condition at which a super knock condition could occur, to mitigate formation of a super knock condition by deploying a super knock countermeasure before the piston reaches top dead center, the super knock countermeasure comprising advancing the discharge timing of the spark plug within a time corresponding to the detected intake or compression stroke.

2. The method of claim 1, wherein the discharge timing is advanced to a set point at which the air-fuel mixture is burned prior to the cylinder reaching top dead center.

3. The method of claim 1, wherein the super knock countermeasure further comprises at least one of (a) opening an exhaust valve to pass burned and unburned air-fuel mixture from within the combustion chamber to outside of the combustion chamber and (b) causing the air-fuel mixture to deviate from a stoichiometric ratio.

4. The method of claim 3, wherein the causing the air-fuel mixture to deviate from the stoichiometric ratio comprises injecting additional fuel into the combustion chamber.

5. The method of claim 1, wherein the detecting pre-ignition of the air-fuel mixture is further sensed by an ion sensor.

6. The method of claim 5, wherein the ion sensor comprises an alternating current phase lock loop circuit or a band pass filter circuit.

7. The method of claim 5, wherein the spark plug comprises the ion sensor.

8. The method of claim 5, wherein the determining whether the internal combustion engine is operating at a condition at which a super knock condition could occur comprises sensing ion currents in the combustion chamber at a crank angle prior to the spark plug being discharged.

9. The method of claim 8, wherein the determining whether the internal combustion engine is operating at a condition at which a super knock condition could occur comprises evaluating an engine rotational speed and an engine load.

10. The method of claim 1, wherein the detecting pre-ignition of the air-fuel mixture is sensed by a pressure sensor that is positioned within the combustion chamber.

11. The method of claim 1, wherein the detecting pre-ignition of the air-fuel mixture comprises detecting a change in rotational acceleration of a rotating engine component that is coupled to the piston.

12. The method of claim 11, wherein the rotating engine component comprises a crankshaft that is coupled to the piston by a connecting rod.

13. An internal combustion engine comprising:
   an engine cylinder comprising a cylinder head and cylinder sidewalls;
   a piston that reciprocates within the engine cylinder, wherein the piston, the cylinder head and the cylinder sidewalls at least partially define a combustion chamber;
   a spark plug that is positioned to extend into the combustion chamber;
   at least one sensor comprising a pressure sensor, a crank angle sensor, a crank speed sensor and a crank accelerometer; and
   an engine control module in electronic communication with the at least one sensor and the spark plug, the engine control module comprising a processor and a memory storing a computer readable instruction set that, when executed by the processor:
      cooperates with at least one of a pressure sensor, a crank angle sensor, a crank speed sensor and a crank accelerometer to detect pre-ignition of the air-fuel mixture during an intake or compression stroke of the piston;
      analyzes the detected pre-ignition of the air-fuel mixture to determine that the internal combustion engine is operating at a condition at which a super knock condition could occur;
      discharges the spark plug during a time corresponding to the same one of the detected intake or compression stroke to burn all that remains of the air-fuel mixture that is present in the combustion chamber before the piston reaches top dead center; and
      upon a determination that the internal combustion engine is operating at a condition at which a super knock condition could occur, deploys a super knock countermeasure before the piston reaches top dead center, the super knock countermeasure comprising advancing the discharge timing of the spark plug within a time corresponding to the same one of the detected intake or compression stroke.

14. The internal combustion engine of claim 13, further comprising:
   an exhaust valve that selectively closes the combustion chamber; and
   a lift mechanism coupled to the exhaust valve, wherein the lift mechanism is in electronic communication with the engine control module.

15. The internal combustion engine of claim 13, wherein the at least one sensor further comprises an ion sensor that comprises one of a direct current circuit or an alternating current phase lock loop circuit or a band pass filter circuit.

16. The internal combustion engine of claim 13, further comprising a compressor positioned to pressurize an intake manifold that is in selective fluid communication with the combustion chamber.

17. The method of claim 1, wherein the advancing the discharge timing of the spark plug within a time corresponding to the same one of the detected intake or compression stroke takes place while maintaining a stoichiometric ratio of the air-fuel mixture.

* * * * *

UNITED STATES PATENT AND TRADEMARK OFFICE
CERTIFICATE OF CORRECTION

| | | |
|---|---|---|
| PATENT NO. | : 11,473,550 B2 | Page 1 of 1 |
| APPLICATION NO. | : 16/280518 | |
| DATED | : October 18, 2022 | |
| INVENTOR(S) | : Singh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 26 days.

Signed and Sealed this
Twenty-fifth Day of July, 2023

Katherine Kelly Vidal
*Director of the United States Patent and Trademark Office*